H. L. MURRAY AND A. GUY.
MACHINE FOR COMPRESSING AND PACKING COMMODITIES.
APPLICATION FILED NOV. 24, 1919.
1,380,674.
Patented June 7, 1921.
4 SHEETS—SHEET 3.
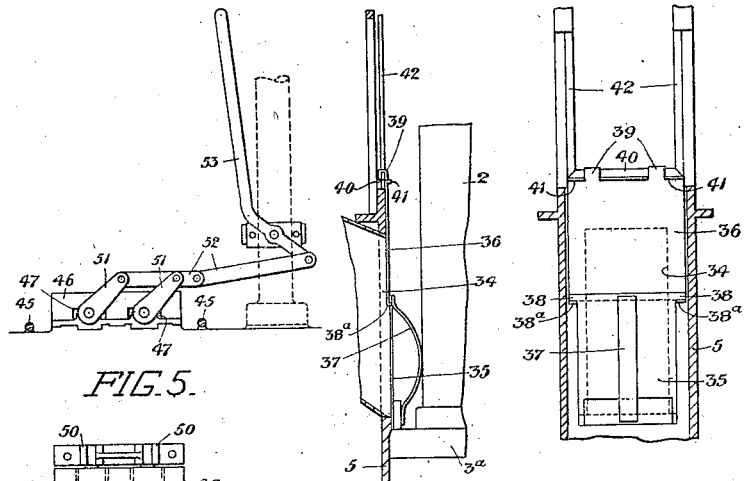
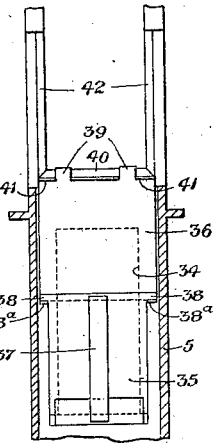
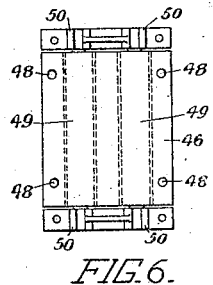
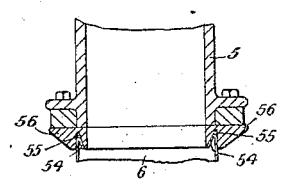
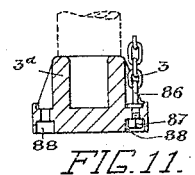
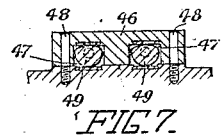
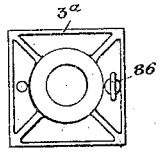
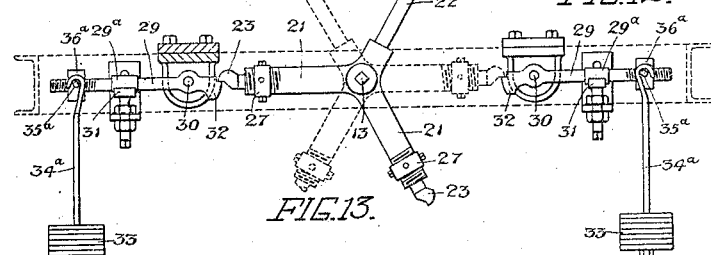
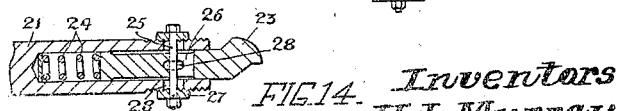
Inventors
H. L. Murray
A. Guy
By H. R. Kerslake
Attorney

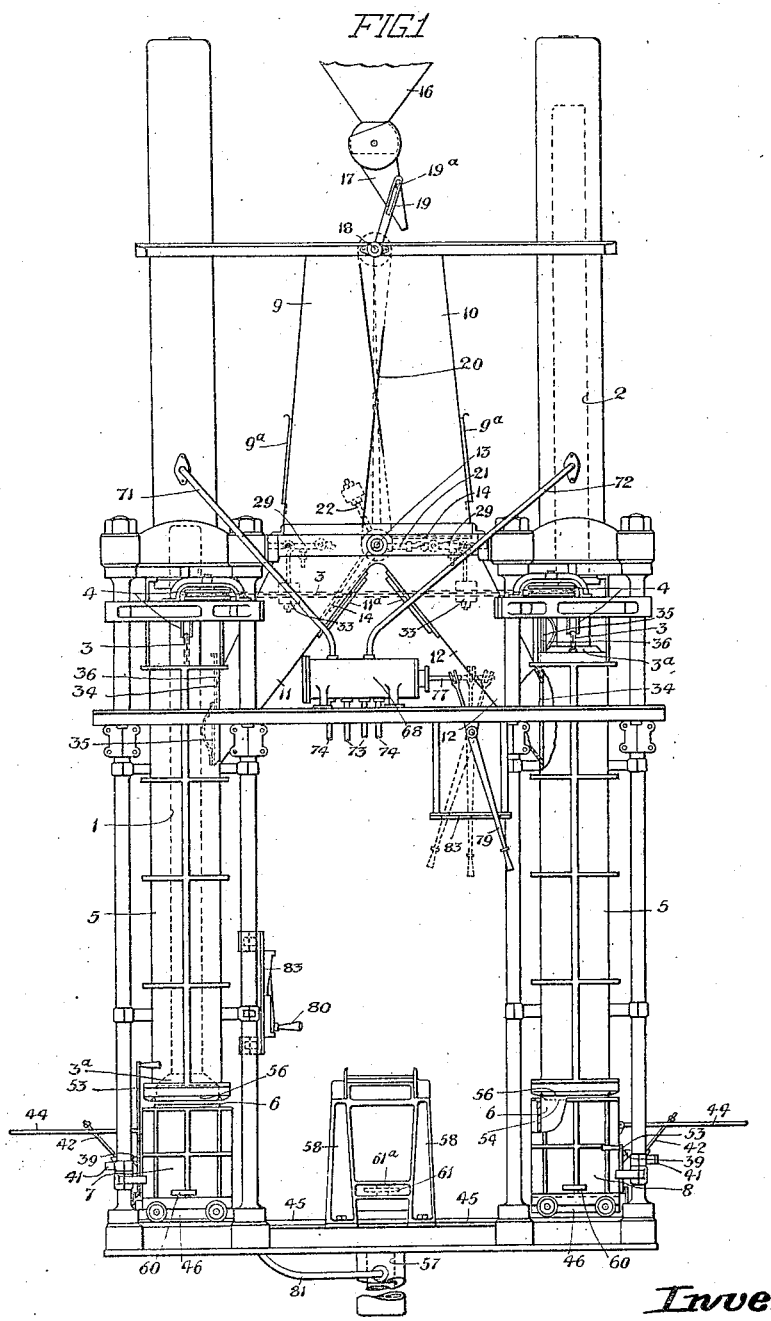

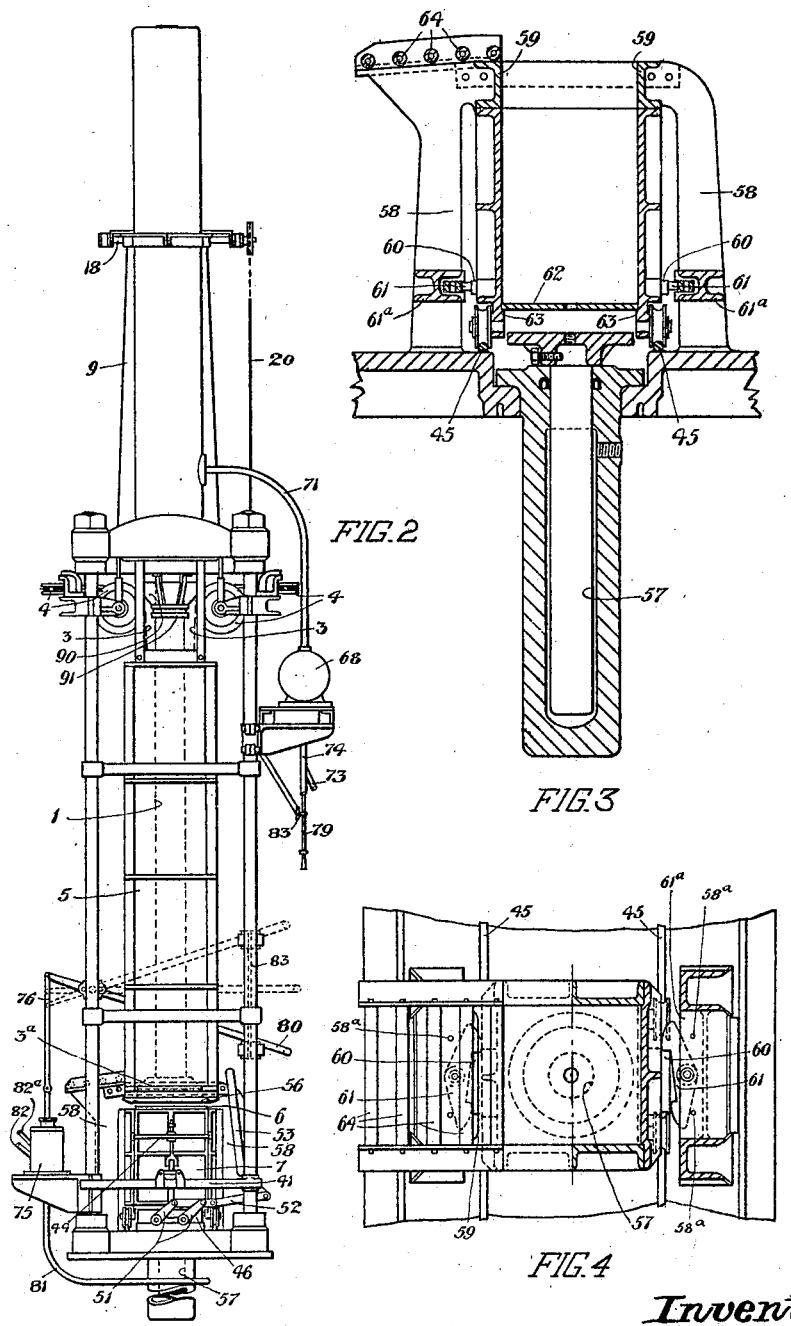

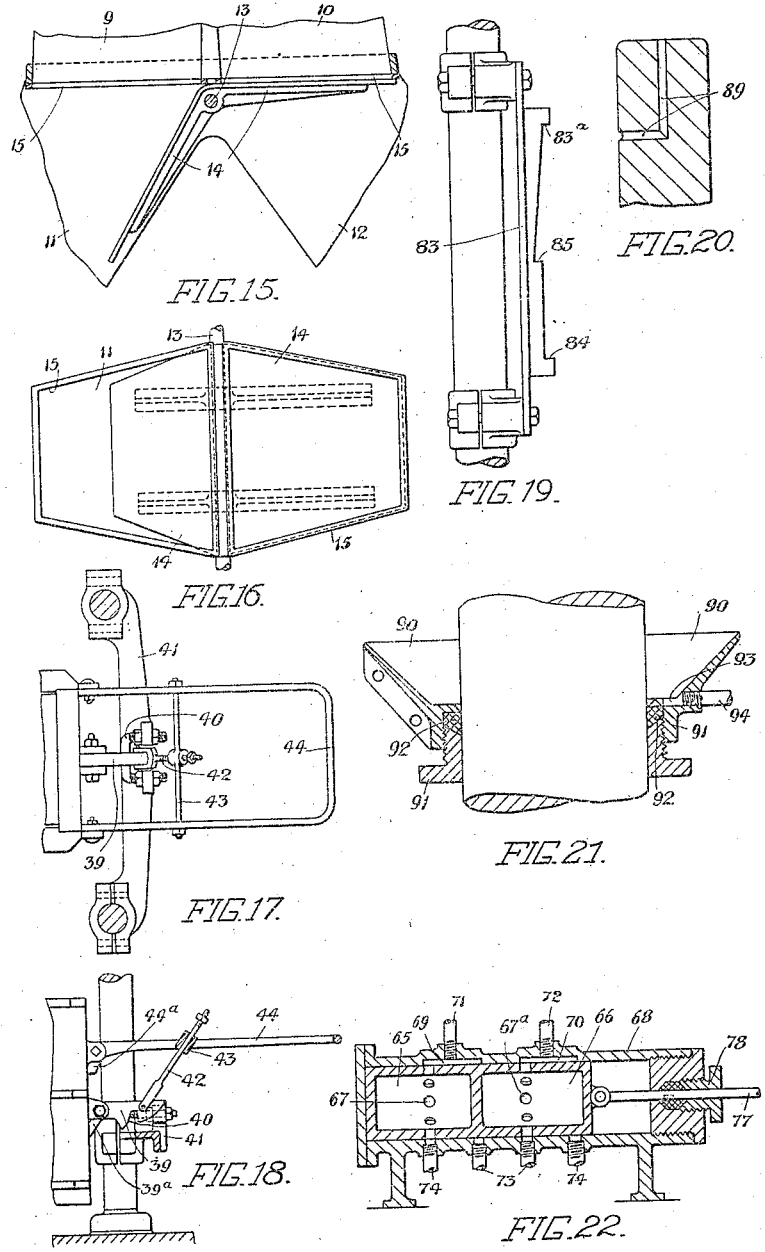

UNITED STATES PATENT OFFICE.

HENRY LAMONT MURRAY AND ALFRED GUY, OF PALMERSTON, NEW ZEALAND, ASSIGNORS TO JOSEPH NATHAN AND COMPANY, LIMITED, OF WELLINGTON, NEW ZEALAND.

MACHINE FOR COMPRESSING AND PACKING COMMODITIES.

1,380,674.  Specification of Letters Patent.  Patented June 7, 1921.

Application filed November 24, 1919. Serial No. 340,223.

*To all whom it may concern:*

Be it known that we, HENRY LAMONT MURRAY and ALFRED GUY, citizens of the Dominion of New Zealand, and residents of Palmerston North, in the provincial district of Wellington, in said Dominion, (whose post-office addresses are, respectively, 7a Bourke street, Palmerston North, and Linton street, Palmerston North,) have invented certain new and useful Improvements in an Improved Machine for Compressing and Packing Commodities, of which the following is a specification.

This invention relates to machines for automatically packing commodities and provides an improved machine, designed specially for packing dried milk powder.

When exporting dried milk, it is highly desirable that the commodity be made to occupy as little space as possible, besides which a given quantity of dried milk can be carried in a reduced number of tins, and it is with the object of facilitating the saving of space and tins, that this improved machine has been designed.

The main parts of the machine comprise two receiving bins, automatic weighing apparatus, molds to constrain the cross sectional shape of the block of powder while under pressure, two mutually counterbalanced hydraulic rams, means for reinforcing the tins into which the powder is pressed, and an ejecting device for removing the filled tins from the containers.

With the exception of the ejecting means the parts are in duplicate, the left hand and the right hand side of the machine operating in alternation so that while powder is accumulating in one side, the powder which previously accumulated in the other side is being packed.

The essential features of the invention comprise a pivoted chute from an overhead hopper, operating in synchronism with a bent weighing plate closing the bottom of one bin only at a time, so that the commodity is diverted into whichever bin is so closed, weighing gear situated at the rear of the machine and adapted to effect the release of said bent plate when a predetermined weight of commodity has accumulated thereon.

Other important features are reinforcing containers for the tins, in the form of trucks specially designed, and having loose bottoms, coupling hooks and U bolts for automatically centering said trucks below the molds, lifting tables and operating gear below the molds for relieving the truck wheels and bearings of pressure during the compression period, and fittings on the molds to take the upper edges of the tins and insure powder tight joints being made between the latter and the molds.

Further features are an ejector ram and a bridge over same, means for accurately centering the trucks containing the filled tins over said ram and beneath the bridge, the latter preventing the trucks from rising on the ejector ram ascending to eject the filled tin from the truck.

The essential features enumerated are combined with the rams, bins, chutes, molds and other known parts to form the complete machine, which will be more particularly described in conjunction with the accompanying drawings, in which:—

Figures 1 and 2 are a front elevation and a side elevation respectively showing the general arrangement of the machine.

Fig. 3 is an enlarged sectional elevation of the central bridge, a truck and ejector ram, Fig. 4 is a part plan and part sectional plan view of the parts illustrated in Fig. 3.

Fig. 5 is an elevation of the truck lifting gear,

Fig. 6 is a plan view and

Fig. 7 a cross sectional view of a truck lifting table.

Figs. 8 and 9 are sectional view and a front view respectively of the slides at the lower ends of the chutes.

Fig. 10 is a sectional view showing the engagement of the upper edges of a tin with the bottom of a mold.

Fig. 11 is a sectional elevation and

Fig. 12 a plan view of a compressing ram head.

Fig. 13 illustrates in elevation the weighing gear and

Fig. 14 is an enlarged sectional view of one of the arms of the latter.

Figs. 15 and 16 are a sectional view and a plan view respectively of the weighing plate.

Figs. 17 and 18 illustrate in plan and elevation respectively the means for centering the trucks below the molds.

Fig. 19 shows a convenient form of hand lever rack.

Fig 20 illustrates the escape vent in the end of a ram.

Fig. 21 is a sectional elevation of a wiper, and Fig. 22 is a sectional view of a convenient type of valve for use on the machine.

The machine comprises two mutually counterbalanced hydraulic rams 1, 2, connected by chains 3 passing over and around pulleys 4, the ram heads 3ª closely fitting and working in vertical molds 5, located one below each ram.

The cross sectional shape of the molds 5 is similar to the horizontal sectional shape of the tins 6 to be filled, the latter being held during the filling operation, in trucks 7—8, which serve as reinforcing containers.

Mounted between the rams 1 and 2, and at a level above the molds 5, is a canister divided by a vertical partition into two bins 9, 10, from the bottoms of which chutes 11, 12, respectively, lead into the upper ends of the molds 5.

Doors 9ª in the bins 9, 10 and doors 11ª in the chutes 11 and 12 are provided for inspection and cleaning purposes.

A shaft 13 mounted through said canister below the vertical partition has fixed thereon a plate 14 (Figs. 1, 15 and 16) bent so that only one of the bins 9, 10 can be closed at the bottom, at a time, said plate 14 closing upward against rubber rings 15 held between the bins and the chutes.

The commodity to be weighed and packed is fed into either of the bins 9, 10 from an overhead hopper 16 through a pivoted chute 17, the latter being moved to direct the commodity into whichever bin is closed at the bottom by the plate 14, by means of a slotted arm 19 on a central shaft 18 across the top of the canister, engaging a pin 19ª on said chute 17.

The shafts 13 and 18 are connected at their front ends by crossed rod and chain and sprocket gear 20, so that the closing of one of the bins 9, 10 at the bottom by the plate 14, occurs simultaneously with the movement of the pivoted chute 17 over the same bin.

The commodity under treatment accumulates on the horizontal portion of the plate 14, until a predetermined weight of same is obtained, whereupon the horizontal portion of the plate 14, opens downward and permits its load to pass through one of the chutes 11, 12 into a mold 5, the movement of the plate 14 automatically closing the bottom of the other bin and causing the pivoted chute 17 to be directed over the latter.

The gear for determining what weight of commodity shall accumulate on the horizontal portion of the plate 14 is located at the rear of the machine and will be described with special reference to Figs. 1, 13 and 14.

On the rear end of the shaft 13 are mounted two arms 21 set at the same angle to each other as the two portions of the plate 14, and mounted on the same side of the shaft 13 as said plate.

An arm 22 carrying a counterweight is also mounted on the rear end of the shaft 13, so that the several parts connected to the shaft 13 are in equilibrium.

Each arm 21 contains a catch 23 kept normally pressed outward by a coiled spring 24 (Fig. 14), a pin 25 passing through the arm, and a slot 26 in the catch, retaining the latter in the arm, while a screw collar 27 and elongated holes 28 provide for the adjustment of the catch.

At each side of the shaft 13 is a lever 29 fulcrumed at 30 and supported beyond the point of fulcrum by an adjustable rest 31. Rubber sleeves 29ª are slipped on the levers 29 where they make contact with the rests 31. The inner ends 32 of the levers 29 are shaped as shown so that a catch 23 of an arm 12 engages therewith, when the latter occupies a horizontal position.

From the outer ends of said levers 29, weights 33 are suspended by hooked rods 34ª hanging on upturned knife edges 35ª on collars 36ª adjustable on said levers.

When the commodity is accumulating on the horizontal portion of the plate 14, the arm 21 on the same side of the shaft 13 is also horizontal and is engaged by the inner end of a lever 29. A predetermined weight of commodity must therefore accumulate on the horizontal portion of the plate 14, in order to cause the depression of the horizontal arm 21, which can only occur on the weight 33 attached to the engaged lever 29 being overcome, whereupon the inner end of the latter depresses sufficiently to free the catch 23 of the horizontal arm 21, which swings downward while the other arm 21 assumes a horizontal position and engages the other lever 29, simultaneously with the other portion of the plate 14 assuming a horizontal position.

The weighted commodity then passes through one of the chutes 11, 12 and one of the ports 34 into a mold 5, to below a ram head 3ª, the upward movement of which has opened said port 34, as follows:—

Each port 34 is controlled by slides 35—36 (Figs. 8 and 9) the lower slide 35 being weighted and kept pressed against the inside of the mold 5 by a flat spring 37 bearing against a ram. The lower slide 35 has upper projections 38 which when the slides are extended, engage lower projections 38ª on the upper slide 36, the latter also having hooks 39 at its upper end which engage the frame 40, when said slide 36 is down, and upper projections 41 which are engaged by the lower slide 35, when the latter is raised.

As the ram head 3ª ascends it engages the lower edge of the lower slide 35, and raises same until its upper edge engages the projections 41 on the upper slide 36, whereupon the slides 35—36 rise together in the guides 42 and open the port 34.

As the ram head 3ª descends, the weighted lower slide 35 also descends until its projections 38 engage the lower projections 38ª on the upper slide 36 whereupon both slides descend and close the port 34.

The commodity passes from a mold 5 into a tin 6 placed in one of the trucks 7, 8 which has previously been centered below the mold and raised so as to force the tin up against the bottom of the mold. The ram in said mold is then caused to descend and compress the commodity in the tin 6, the truck in which the latter is held being specially built to withstand the compression and prevent the tin from bursting.

Accurate centering of the trucks 7, 8 below the molds 5 is essential, and for this purpose a hinged coupling hook 39 (Figs. 1, 17 and 18) is mounted on each truck, said hooks 39 automatically engaging adjustable U bolts 40 on brackets 41, when said trucks are accurately located below the molds 5. The brackets 41 are carried by the supporting columns of the machine, as shown in Figs. 1, 2, 17 and 18.

The hooks 39 are connected to forked rods 42 which pass upward through cross bars 43 on the pivoted truck handles 44, said rods 42 being provided with nuts or stops on their upper ends.

The handles 44 are used for propelling the trucks 7, 8 along the rails 45, and by raising them slightly the hooks 39 can be disengaged from the U bolts 40.

Stops 39ª and 44ª are provided on the hooks 39 and handle 44 respectively to prevent them falling below horizontal positions.

Before compressing the commodity in a tin 6, it is essential that the truck containing the latter, be so held that the downward pressure of the ram will not be taken by the truck wheels and bearings, and to relieve the latter of said pressure a specially devised lifting table 46 is provided directly below each mold 5.

These tables 46 (see Figs. 5, 6, 7,) each comprise a flat block of metal formed with recesses 47 in their under surfaces, and having vertical movement on upright studs 48.

In the recesses are horizontal bars 49 cam shaped in cross section, and shaped at their ends to work in vertically slotted bearings 50.

Short levers 51 on the ends of the bars 49 are connected by links 52 to a hand lever 53 mounted on a column, so that by operating said hand lever 53, the bars 49 can be turned to force the table 46 upward, the latter engaging the lower edges of the truck ends and the truck bottom between the wheel bearings.

The tins 6 have inturned upper edges 54 (Fig. 10) which project slightly above the truck so that when the latter is raised by the table 46, the edges 54 are forced into recesses 55 in fittings 56 on the lower ends of the molds 5. This is for the purpose of insuring a tight joint being made between the tins and the molds during the time the commodity is being compressed in the tins by the ram heads 3ª.

After the commodity has been compressed in the tin the truck is lowered onto the rails 45, and the hook 39 disconnected from the U bolt 40. The truck is then propelled along the rails 45 until it is over the ejector ram 57 and beneath a bridge 58, the upper edges of the truck sides passing below the horizontal parallel bars 59 of said bridge 58 (Figs. 3 and 4.).

In order to insure accurate centering of the trucks over the ejector ram 57, projections 60 are provided on both sides of said trucks, said projections engaging with one end of double ended catches 61 pivoted on the lower bars 61ª of the bridge 58, the catches 61 being made double ended as shown in order to engage the projections 60 of a truck run beneath the bridge from either side.

Stops 58ª are provided to prevent the catches 61 from moving too far backward.

The bottoms 62 of the trucks are loose plates resting on internal ledges 63.

The ram 57 is operated independently of the rams 1, 2 and when it is required to eject a filled tin 6 from a truck, the ram 57 is caused to ascend and press the truck bottom 62 and tin resting thereon upward, the truck being prevented from rising by the upper bars 59 of the bridge 58.

When the filled tin is above and clear of the upper bars 59 the ram 57 is held stationary, and the tin pushed off the truck bottom 62, which is now resting on the ram head above the bars 59, on to the rollers 64, to be otherwise dealt with.

The ram 57 is then permitted to descend again and the truck bottom 62 lowered on to the ledges 63.

A form of control valve suitable for use with the machine, is illustrated in Fig. 22, and comprises a hollow sliding valve with two chambers 65, 66, a set of ports 67 opening into chamber 65 and another set of ports 67ª opening into chamber 66.

The valve casing 68 has two ports 69, 70 therein which communicate through pipes 71, 72, respectively, with the cylinders of the rams 1 and 2.

Exhaust pipes 73 lead from the casing 68, and inlet pressure pipes 74 convey the hydraulic pressure to the casing 68.

The valve is connected by a rod 77 passing through a stuffing box 78 to a hand lever 79 (Figs. 1 and 2).

The set of ports 67 is adapted to put the pipe 71 to the cylinder of the ram 1 alternately in communication with a pressure pipe 74 and an exhaust pipe 73, in the drawing, the pipe 71 is shown in communication with a pressure inlet pipe 74.

The other set of ports 67$^a$ performs similar service between the pipe 72 to the cylinder of the ram 2 and the other exhaust pipe 73 and pressure inlet pipe 74, and in the drawing, pipe 72 is shown in communication with an exhaust pipe 73.

The sets of ports 67 and 67$^a$ are so arranged that when pressure is being admitted to one ram cylinder the other ram cylinder is exhausting. The hand lever 79 when at either end of its stroke causes the rams 1 and 2 to operate, and when midway or vertical, said rams 1 and 2 are held stationary, owing to the sets of ports 67 and 67$^a$ being both midway between exhaust and inlet ports.

The valve for operating the ejector ram 57 is similar in construction to that just described except that it is single chambered and controls only one ram, said valve being contained in a casing 75 mounted at the rear of the machine (Fig. 2) and connected by a rod 76 to an operating hand lever 80.

A pipe 81 connects the valve casing 75 with the cylinder of the ram 57, and an exhaust pipe 82 and a pressure inlet pipe 82$^a$ to and from the casing 75 are also provided.

A rack 83 suitable for use with either of the valve operating levers 79 or 80 is shown in Fig. 19. This rack can be secured to a column or other convenient part of the machine, and has end stops 83$^a$ 84 and a central or neutral stop 85, the hand lever being retained against the rack, by its natural spring.

The chains 3 connecting the rams 1, 2 are attached to eyebolts 86 (Fig. 11) which pass through the ram heads 3$^a$, nuts 87 in recesses 88 screwing on said eyebolts 86 providing a means of adjusting the tension of the chains.

The rams are provided with vent holes 89 (Fig. 20) which come into action in the event of the hydraulic pressure not being cut off at the end of the ram's normal stroke, and thereby prevent damage to the machine.

To prevent the possibility of any water which might leak past the leathers when the machine is idle getting into the molds 5, wipers are fitted around the rams 1 and 2 below the glands, to which they are bolted.

Each wiper (Fig. 21) consists of an upper funnel shaped casting 90 surrounding the ram and screwing on to a lower casting 91 also surrounding the ram, with a packing ring 92 between the castings 90, 91 and the ram. An outlet 93 to which a small pipe 94 to drain off the accumulated water is also provided.

With the various parts of the machine in the positions indicated in Fig. 1, and each truck 7—8 containing a paper lined tin 6, the operation of the machine is as follows:—

The trucks 7—8 are run under the molds and accurately centered by the hooks 39 automatically engaging the U bolts 40. Truck 8 under the raised ram 2 is then lifted by depressing the hand lever 53 as shown, so that the table 46 will take the pressure of the ram 2 when the latter descends and also so that the inturned upper edges 54 of the tin 6 enter the recesses 55 in the fitting 56.

Meanwhile commodity from the hopper 16 is being directed into bin 10 by the pivoted chute 17 and is accumulating on the horizontal portion of the plate 14, and as soon as the predetermined weight of commodity has accumulated the horizontal portion of the plate 14 drops and the weighed commodity passes via chute 12 and the open port 34 into mold 5 fed thereby.

The same operation of the plate 14 closes the bottom of the bin 9, and diverts the chute 17 over the latter and the commodity commences to collect therein.

The hand lever 79 is now pushed over to the extreme reverse position, which causes hydraulic pressure to be admitted to the cylinder of ram 2, and permits the water contained in the cylinder of ram 1 to exhaust. Ram 2 descends and allows the slides 35—36 above the open port 34 to close the latter, at the same time raising ram 1 which in rising opens the other port 34.

The descent of ram 2 compresses the weighed commodity in the tin 6 held in truck 8, after which the hydraulic pressure is cut off.

Truck 8 is then lowered on to the rails 45, the handle 44 raised slightly so as to disengage the hook 39 from the U bolt 40, whereupon the truck 8 is propelled along the rails 45 to beneath the bridge 58 and centered over the ejector ram 57 by the projections 60 automatically engaging the catches 61.

The ejector ram 57 is then caused to ascend by operating the hand lever 80, and the truck bottom 62 and filled tin 6 raised above the bars 59, when the hydraulic pressure to ram 57 is cut off, while the filled tin 6 is pushed on to the rollers 64.

When the tin is clear the ram 57 is permitted to descend again and return the truck bottom 62 to its proper position on the ledges 63, after which truck 8 is withdrawn from beneath the bridge, a fresh tin 6 placed therein and the truck returned to beneath the mold 5.

A similar series of operations then takes place at the other side of the machine, whereupon the tin held in truck 7 is filled and in due course ejected.

What we claim and desire to secure by Letters Patent of the United States is:—

1. A machine for the purpose set forth, comprising a pair of mutually balanced hydraulic rams; molds below said rams; a pair of bins between said rams; inclined chutes from said bins to said molds; a bent plate keyed on a rocking shaft and adapted to close the bottom of one bin only at a time; a hopper; a pivoted chute from the hopper over said bins; gearing between said rocking shaft and said pivoted chute whereby movement of the latter over a bin synchronizes with the closing of the bottom of said bin by said bent plate; slides at the lower ends of said chutes adapted to open the latter to the molds on the ascent of ram heads within the molds and to close said chutes on the descent of said ram heads; reinforcing tin containers placed below said molds, and means for controlling the operation of said rams.

2. A machine for the purpose set forth, comprising, a pair of mutually balanced hydraulic rams; molds below said rams; a pair of bins between said rams; inclined chutes from said bins to said molds; a bent plate controlling the passage of commodity from said bins to said chutes; automatically operated slides controlling the passage of commodity from the chutes to the molds; trucks on a track passing directly below said molds and a central bridge; an ejector ram below said bridge; and means for controlling the operation of said rams.

3. A machine for the purpose set forth, comprising, a pair of mutually balanced hydraulic rams; molds below said rams; a pair of bins between said rams; inclined chutes from said bins to said molds; a bent plate for controlling the passage of commodity from the bins to the chutes; automatically operated slides for controlling the passage of commodity from the chutes to the molds; trucks containing tins, running on a track passing directly below said molds and a central bridge; an ejector ram below said bridge; hooks on said trucks and U bolts projecting from brackets on the machine columns for centering said trucks below the molds; side projections from said trucks and catches on said bridge for centering said trucks over the ejector ram; lifting tables for said trucks below said molds; means for insuring powder tight joints between the upper edges of the tins and the molds; and means for controlling the operation of said rams.

4. A machine for the purpose set forth, comprising, a pair of mutually balanced hydraulic rams; molds below said rams; a pair of bins between said rams; inclined chutes from said bins to said molds; a bent plate for controlling the passage of commodity from said bins to said chutes; automatically operated slides for controlling the passage of commodity from said chutes to said molds; trucks containing tins the upper edges of which project above the trucks; a track for said trucks directly below said molds and a central bridge; an ejector ram arranged below said bridge; supporting columns for the machine; brackets mounted on said columns; U-bolts projecting from said brackets; hooks on said trucks for engaging the U bolts; pivoted handles on said trucks connected to said hooks; catches on said bridge; side projections from said trucks for engaging said catches; lifting tables for said trucks below said molds; recessed fittings on the lower ends of the molds to take the upper edges of the tins; and means for controlling the operation of said rams.

5. In a machine for the purpose set forth, a mold; a ram head working in the mold; an inclined chute entering the latter near the top thereof; a weighted slide working over the lower end of said chute and adapted to be moved upward to open said chute to the mold by the ascent of said ram head, and to drop by reason of its own weight on the ram head descending.

6. In a machine for the purpose set forth, a mold; a ram head working in the mold; an inclined chute entering the latter near the top thereof; a weighted lower slide, and an upper slide covering the lower end of said chute and both adapted to be moved upward to open said chute to the mold by the ascent of the ram head within said mold, and to drop by reason of the weight of said lower slide on the descent of the ram head.

7. In a machine for the purpose set forth, a mold; an inclined chute entering the latter near its top; an upper slide with vertical hooks and right angled projections at its upper edge and right angled projections at its lower edge; a weighted lower slide with side extensions at its upper end, which engage the lower projections on said upper slide, a ram working vertically in said mold, guides for said slides above the mold, and a flat spring between the ram and said lower slide.

8. In a machine for the purpose set forth, a machine column having a bracket provided with a U bolt, a tin container comprising a reinforced truck, a mold above the truck, and a coupling hook pivoted on said truck and engaging said U bolt when said truck is centered below the mold.

9. In a machine for the purpose set forth, a machine column having a bracket provided with a U bolt, a tin container comprising a reinforced truck, a mold above the truck, a coupling hook pivoted to said truck and engaging said U bolt when said truck is centered below the mold, a handle pivoted to said truck and a rod connecting said hook and handle.

10. In a machine for the purpose set forth, a pair of molds and a bridge between the same, a tin container comprising a truck having internal ledges, a track arranged beneath the molds and bridge for supporting said truck, a loose bottom for the truck resting on said internal ledges, and an ejector ram arranged below said bridge and adapted to engage said bottom for removing the tin from said truck.

11. A machine of the kind defined by claim 10 in which the bridge is provided with bars for limiting the upward movement of said bottom.

12. A machine of the kind defined by claim 10 in which the truck is provided with side projections, and catches arranged on said bridge and designed to engage said catches.

13. In a machine for the purpose set forth, a tin container comprising a truck, a bridge arranged over said truck, an ejector ram arranged below said truck, projections provided on the sides of said truck, and double ended catches pivotally mounted on said bridge and adapted to automatically engage said projections when the truck is moved beneath the bridge and centered over the ram.

14. In a machine for the purpose set forth, means for packing material into a tin, a bridge, a truck designed to contain a tin, a track extending from the packing means to the bridge and designed to support the truck in moving from the packing means to the bridge, an ejector ram arranged below the bridge and designed to elevate a tin carried by the truck, and a discharge frame arranged at one side of the bridge and positioned to receive a tin elevated by the ram.

15. In a machine for the purpose set forth, a truck designed to support a tin, means for packing material into the tin carriet by the truck, means arranged below the packing means for elevating the tin into engagement with the packing means, a bridge, a track extending from the packing means to the bridge and designed to support the truck while the same is moving from the packing means to a position beneath the bridge, an ejector ram arranged below the bridge and designed to elevate a tin carried by the truck, and a discharge frame arranged at one side of the bridge and positioned to receive a tin elevated by said ram.

16. In a machine for the purpose set forth, a mold, a vertically movable table arranged beneath said mold, horizontal bars cam-shaped in cross section arranged beneath said table and engaging said table, and means for imparting a turning movement to said bars, whereby said table may be raised.

17. In a machine for the purpose set forth, a mold, a vertically movable table located beneath the mold, stationary vertical studs slidably engaged by said table, horizontal bars cam shaped in cross section arranged beneath the table and engaging the same, slotted bearings for the ends of said bars, and means for imparting a turning movement of said bars, whereby said table may be raised.

18. In a machine for the purpose set forth, a mold, stationary vertical studs arranged beneath the mold, a vertically movable table slidably mounted on said studs, the under surface of said table being recessed, horizontal bars, cam shaped in cross section, located in said recesses and engaging said table, slotted bearings supporting the ends of the bars, and a hand lever and connecting levers for imparting a turning movement to said bars.

In testimony whereof we affix our signatures.

HENRY LAMONT MURRAY.
ALFRED GUY.

Witnesses:
I. B. BEALE,
E. W. B. CAREY.